United States Patent
Kandell et al.

(10) Patent No.: US 8,459,431 B2
(45) Date of Patent: Jun. 11, 2013

(54) HOUSING MEMBER FOR CLUTCH MECHANISM

(75) Inventors: Joseph E. Kandell, Battle Creek, MI (US); David D. Martinson, Marshall, MI (US); James E. Benson, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 388 days.

(21) Appl. No.: 12/844,653

(22) Filed: Jul. 27, 2010

(65) Prior Publication Data

US 2011/0017567 A1    Jan. 27, 2011

Related U.S. Application Data

(60) Provisional application No. 61/228,967, filed on Jul. 27, 2009.

(51) Int. Cl.
*F16D 13/58* (2006.01)

(52) U.S. Cl.
USPC .......................................................... 192/112

(58) Field of Classification Search
None
See application file for complete search history.

(56) References Cited

U.S. PATENT DOCUMENTS

| | | | | |
|---|---|---|---|---|
| 2,913,885 A | * | 11/1959 | Debrie | 226/48 |
| 4,180,024 A | * | 12/1979 | Hernandez | 123/41.46 |
| 4,403,974 A | * | 9/1983 | Sherman et al. | 474/11 |
| 4,692,053 A | * | 9/1987 | Sampedro | 403/24 |
| 4,899,860 A | * | 2/1990 | Diederich | 192/58.4 |
| 5,203,441 A | * | 4/1993 | Monette | 192/112 |
| 5,746,627 A | * | 5/1998 | Bratten | 439/721 |
| 2006/0175595 A1 | * | 8/2006 | Carnevali | 256/65.14 |

* cited by examiner

*Primary Examiner* — David D Le
*Assistant Examiner* — Mark Manley

(57) ABSTRACT

A housing member for a friction clutch and a method for making it. The housing member is made for use with two differently sized fan members. Two annular raised mounting pilot surfaces are provided, one of which is machine finished for mounting one of the two fan members. Two sets of fan member mounting holes are also provided, one set of which is used to mount one of the two fan members thereon.

4 Claims, 3 Drawing Sheets

HOUSING MEMBER FOR CLUTCH MECHANISM

CROSS REFERENCE TO RELATED APPLICATIONS

This application claims the benefit of U.S. Patent Provisional Application Ser. No. 61/228,967 filed on Jul. 27, 2009.

TECHNICAL FIELD

The present invention relates to friction clutches and more particularly to housing members for such clutches.

BACKGROUND OF THE INVENTION

There are various clutch mechanisms known today, particularly for driving radiator cooling fans for cars, trucks and other vehicles. The cooling fan clutch mechanisms typically are fluid coupling devices, wet friction clutches or dry friction clutches, and are in common use today in these vehicles. The fluid coupling devices are typically viscous clutch drives.

Also, within each type of clutch mechanism, there are various sizes and models. Some clutch mechanisms are designed specifically for one vehicle, which others can be used for a number of vehicles. Some clutch mechanisms are also designed for particular engines, and thus are utilized for all vehicles which contain that engine. The same components are utilized for different clutch mechanisms where possible to save expense.

With all of these clutch mechanisms, efforts are being made to improve performance and reduce costs. The efforts can be in many areas, such as manufacturing, materials, assembly and labor. At the same time, the efficiencies and performance of the clutch mechanisms need to meet the customers' requirements.

It thus is an object of the present invention to provide a clutch mechanism that is less expensive to manufacture and produce and yet which maintains its high levels of performance and efficiency. It is another object of the present invention to provide components of clutch mechanisms that can be used for more than one model or product.

SUMMARY OF THE INVENTION

The present invention provides a clutch mechanism which is easier and less costly to manufacture and produce, and which has components which can be utilized for more than one model of clutches. The present invention has particular applicability for dry friction clutches, but can be used for other types of clutch mechanisms in use today.

Clutch mechanisms have an outer casing which typically includes a housing member and a body member. One or both of these members could be driven at input speed by the vehicle engine. It is also possible that the housing and body member are stationary and coupled together and that the moving components are positioned inside the housing.

The housing members are made of a metal material, such as aluminum or steel, and are cast are molded close to their final sizes and shapes. Surfaces on the housing members which are used to mate with other components are typically machine finished to close tolerances to enhance assembly and performance.

With the present invention, a new housing member is provided which has particular use for dry friction clutch mechanisms. For the clutch mechanism, the housing member is mated with a body member which typically is rotating at input speed. An activation mechanism is provided which selectively causes the housing member to rotate along with the body member. This in turn rotates the cooling fan which is mounted onto the housing member.

The housing member is provided with two possible sets of mounting holes so that it can be used with more than one type or size of fan member. One of the sets of mounting holes is adapted to hold fasteners, such as bolts, in order to hold the appropriate fan member in place. If the housing member is made from a softer material, like aluminum, then threaded plugs are used to hold the fasteners in place. If the housing member is made from steel or another harder material, the holes can be tapped.

The housing member is also provided with two possible pilot surfaces for mounting two sizes or types of fan members on the housing. The pilot surfaces are annular raised ridges, the first ridge is positioned adjacent the central opening in the housing member and the second ridge is positioned radially outwardly toward the perimetral edge of the housing member. One of the two pilot surfaces is machined for use in mounting a fan member on the housing member. The pilot surface selected depends upon the use of the clutch mechanism and the type and size of fan member to be mounted on it.

If the inner annular raised ridge is finished and utilized to mount a fan, then the outer annular raised ridge is removed. This provides an annular flat surface for mounting of the fan on the housing member. The outer ring of mounting holes (which can be blind holes) are filled or plugged in some manner. If the outer ring of holes are utilized to mount a fan, the inner ring of holes can be covered with an annular disc member or the like.

Other advantages and features of the present invention will become apparent from the following description of the invention, when viewed in accordance with the attached drawing figures and also the appended claims.

DESCRIPTION OF PREFERRED EMBODIMENTS

Figure 1:
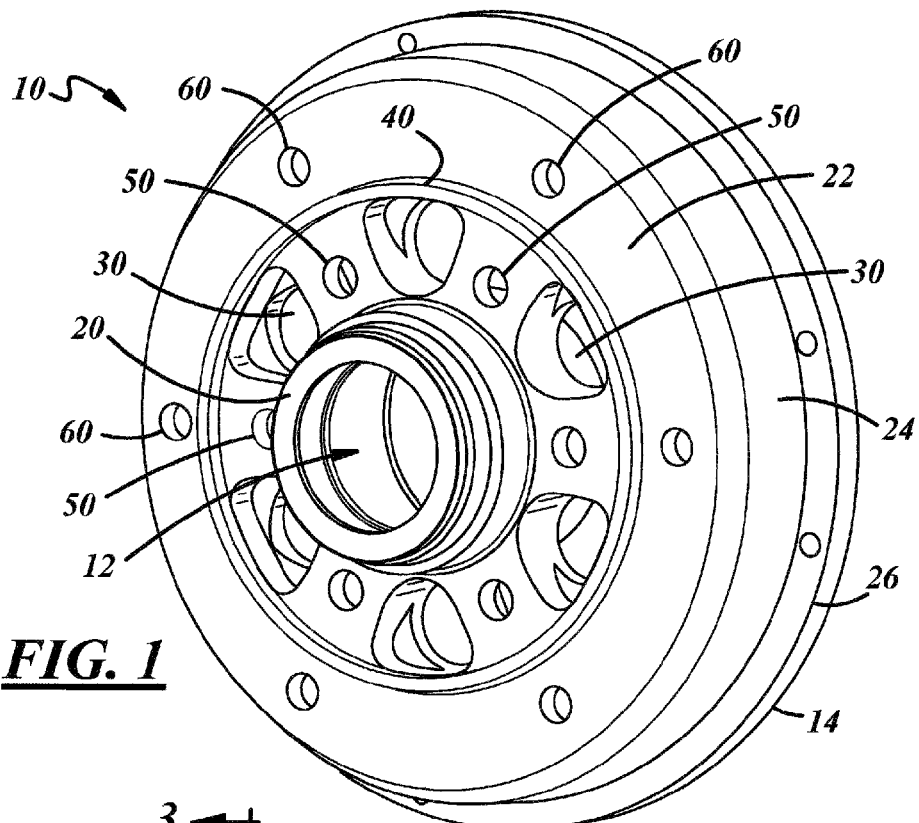
FIG. 1 is a perspective view of an embodiment of the inventive housing member.
Figure 2:
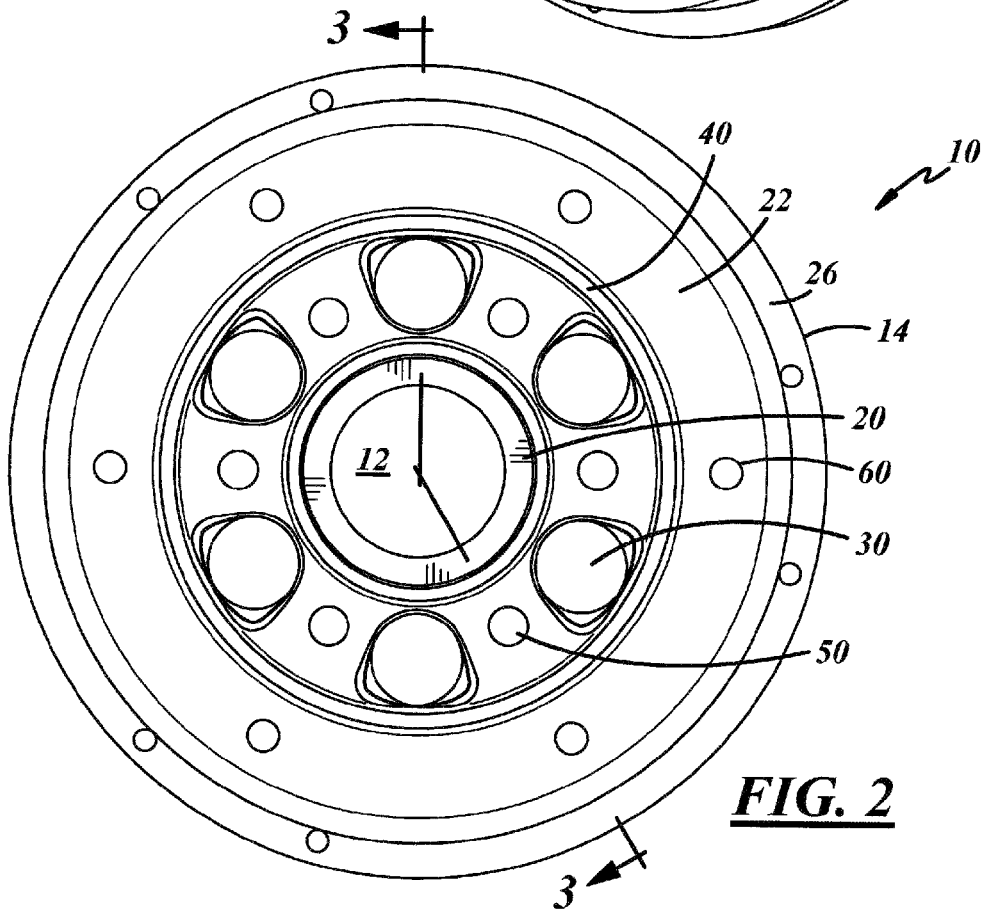
FIG. 2 is a front plan view of an embodiment of the inventive housing member.

An embodiment of the present invention is shown in FIGS. 1 and 2. The present invention relates to a housing member 10 which is manufactured and provided as a component for a clutch mechanism. The housing member is particularly designed to be a part of a dry friction clutch mechanism used for a radiator cooling fan for a vehicle, such as a car or truck.

Even though the description herein relates to an embodiment of a housing member for use with a dry friction clutch, it is to be understood that the present invention should not be limited in that manner. The present invention can comprise several related embodiments and can be utilized with other clutch mechanisms for other purposes and other vehicles.

The housing member 10 is adapted to mate with a body member and other components for a dry friction clutch mechanism. These other components are not shown or described herein, but are commonly known to persons of ordinary skill in the art. Thus they do not need to be further described herein.

In general, the present invention relates to a housing member which can be easily converted for use with different fan members and has features which provide for this. The invention allows manufacture of a common housing member for use with different clutch models and mechanism, as well as with different fan members. This simplifies the manufacturing process for the housing member for these clutch mechanism and cooling fans, and also saves considerable expense. It further prevents the build-up of excess inventory of housing members for infrequently used clutch mechanisms.

The housing member 10 is preferably made of a metal material such as steel or aluminum. Aluminum is preferred at this time due to its lightweight and ease of manufacturing. The housing member is preferably made by a molding process and is cast in the size and shape shown in FIGS. 1 and 2.

The housing member has a central opening 12 and an outer perimetral edge 14. A raised annular projection 20 surrounds the opening 12 and project outwardly generally transverse to the outer surface 22 of the housing member. The housing member is substantially dish shaped with an annular side member 24 projecting generally rearwardly from the surface 22 to the outer perimetral edge 14. An annular flange 26 is positioned around the outer edge 14.

A series of openings 30 are positioned on the surface 22 adjacent the annular projection 20. The openings 30 are provided to allow access to the inside of the clutch mechanism to mount it on the pulley or other mounting structure by bolts or other fasteners. The openings 30 also allow air to enter the interior of the clutch mechanism and assist in cooling the internal components. In the embodiment shown in FIGS. 1 and 2, six openings 30 are provided and each has a generally triangular shape. It is to be understood that the number of openings 30 and their precise shape are not critical, so long as there are a sufficient number to allow access to mount the clutch mechanism. A larger or smaller number of openings can be provided and they can have other shapes.

An annular raised ridge 40 is also provided on the surface 22 as shown in the drawings. The ridge project is substantially transverse to the surface 22 and projects outwardly in the same direction as the annular projection 20.

A first set (or ring) of fan mounting holes 50 is provided on surface 22. These holes 50 form a ring and are positioned between the annular projection 20 and the annular ridge 40. The holes 50 preferably pass completely through the housing member.

A second set (or ring) of fan mounting holes 60 are also provided on the surface 22. These holes 60 form a ring and are positioned radially outwardly of the annular ridge 40 and between the ridge 40 and the outer perimetral edge 14. The holes 60 are preferably formed as blind holes and are only machined completely through the housing member if they are used to mount a fan.

Figure 3:
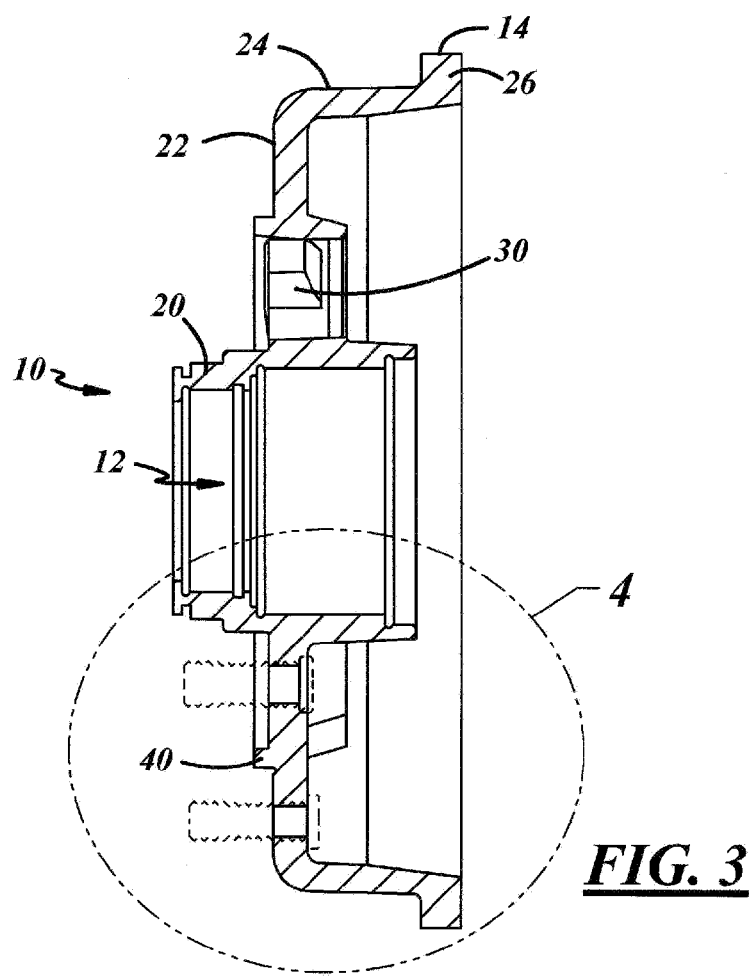
FIG. 3 is a cross-sectional view of the housing member shown in FIG. 2.
Figure 4:
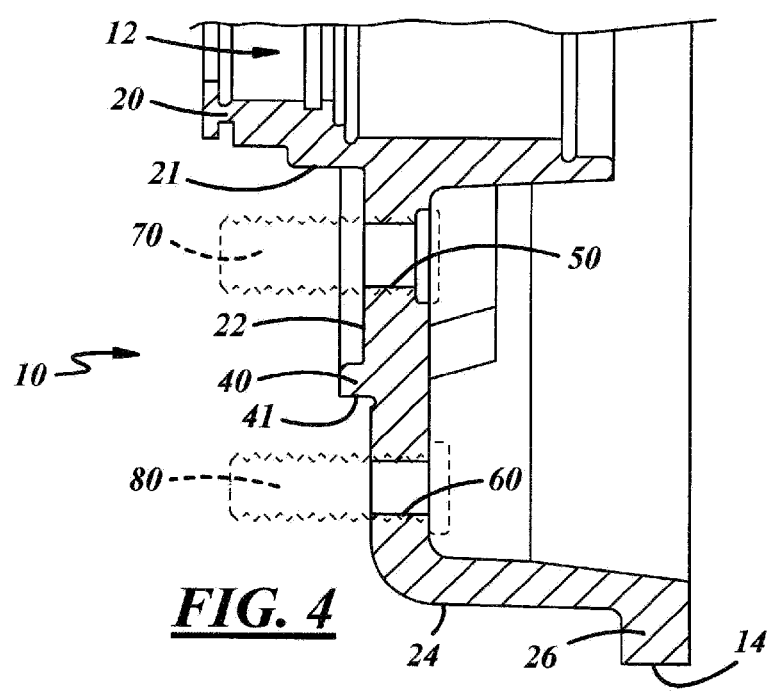
FIG. 4 is an enlarged view of a portion of FIG. 3.

Cross-sectional views of the housing member 10 are shown in FIGS. 3 and 4, where FIG. 4 is an enlarged view of a portion of FIG. 3. As shown, the central annular projection 20 has a first annular pilot surface 21 located immediately adjacent the surface 22. In addition, the annular ridge member 40 has a second annular pilot surface 41. The pilot surfaces 21 and 41 are provided for use in mounting two different sizes of fan members on the housing member 10. The pilot surface which is actually used for a fan member is finished by machining in order to have the finished surface with precise tolerances necessary to securely hold, position and mount the fan member thereon.

Once a fan member is positioned on the housing member and mounted on its respective pilot surface, fastening members, such as bolts 70, 80 are used to securely hold the fan member in place. In this regard, FIG. 4 depicts two fasteners 70 and 80, although when the housing member is used on a clutch mechanism to mount a fan member, only one set of holes (50 or 60) and only one set of fasteners (70 or 80) are utilized. The set of holes being utilized for this purpose (i.e. either holes 50 or 60) are provided with threads before the fasteners are installed in place.

If the housing member is made of aluminum (or another softer material), then threaded plug members are installed (e.g. press fitted) in the holes. These plug members are made of steel or another hard material. If, on the other hand, the housing member is made of steel (or another harder material), then the holes being utilized can merely be tapped.

Figure 5:
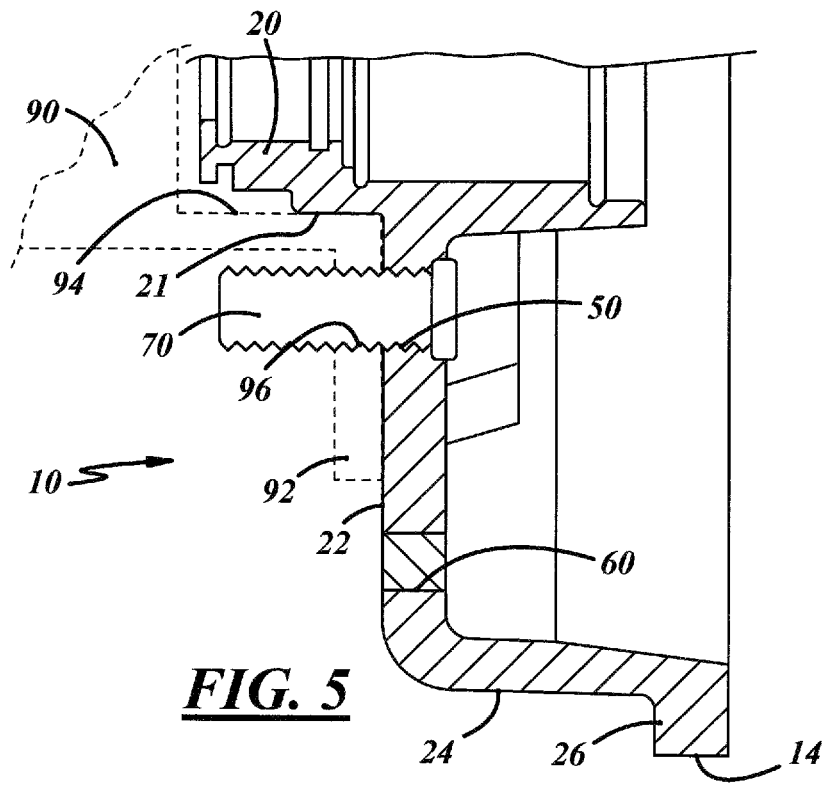
FIG. 5 depicts an embodiment of the present invention.
Figure 6:
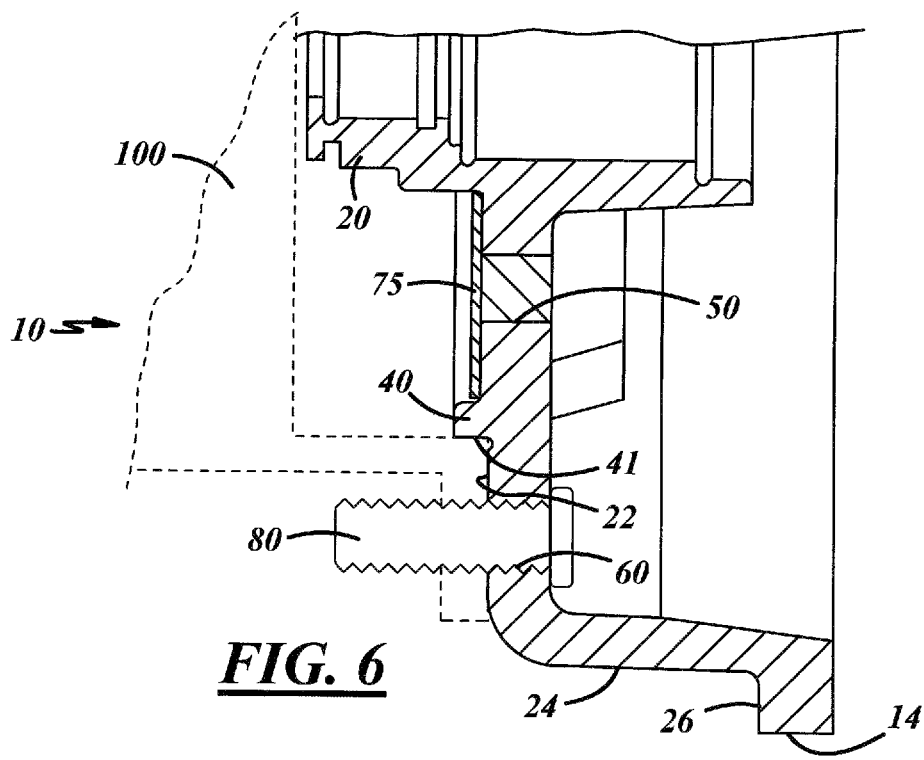
FIG. 6 depicts another embodiment of the present invention.

The two uses of the housing member embodiment 10 made in accordance with the present invention are shown in FIGS. 5 and 6. The use of the housing member 10 with a smaller fan member 90 is shown in FIG. 5 and the use of housing member 10 with a larger fan member 100 is shown in FIG. 6.

When a cooling fan member 90 of the size shown in FIG. 5 is mounted on the clutch mechanism, only the pilot member 21 and set of holes 50 are utilized. The fan member 90 has a cylindrical mounting member 94 which fits precisely over the finished pilot surface 21. The pilot member 41 and set of holes 60 are not utilized. The outer ring or set of holes 60, whether blind or through holes are preferably plugged or filled. Also, in order to satisfactorily mount fan member 90 on the housing member 10 and allow the fan member flange 92 to lay flat on surface 22, the annular ridge member 40 is eliminated. The ridge member 40 can be removed, for example, by machining the surface 22.

After the fan member 90 is mounted over the annular projection 20, as shown in FIG. 5, fastener members, such as bolts 70, are threaded through the set of holes 50 (through threaded plugs if they are utilized) and through corresponding openings 96 in the flange 92 of the fan member 90. Appropriate nuts or other securing mechanism (not shown) are then used on the outer ends of the fastener members 70 to hold them and the fan member 90 tightly in place.

When a fan member 100 of the size shown in FIG. 6 is utilized on the clutch mechanism, only the pilot 41 and set of holes 60 are utilized. If the holes 60 are blind holes, then they are machined completely through the housing member. The pilot member 21 is left unfinished and unused, and the set of holes 50 are left untapped and unused. A flat annular disc member 75 can be utilized to cover over the set or ring of unused holes 50. The pilot surface 41 is machine finished in order to allow the cylindrical mounting member 102 of the fan member 100 to fit precisely over it.

Once the fan member 100 is mounted on the housing member, as shown in FIG. 6, fastener members, such as bolts 80, are threaded through the set of holes 60 which have been plugged or tapped with threads for this purpose. The fastener members extend through holes 104 in the flange member 106 of the fan member 100 and then appropriate securing mechanism, such as nuts (not shown), are utilized to securely and tightly hold the fan member in place on the housing.

As an example, the present invention can be used as a housing member for a dry friction clutch. The housing member is made from an aluminum casting. The inner pilot surface is used for 2.562 inch fans, and the outer pilot surface 41 is used for 5.0 inch fans. When the 5.0 inch pilot is utilized, a 5 mm thick annular aluminum adapter plate 75 is piloted into the inner set of holes 50 and secured with screws.

While the invention described in connection with various embodiments, it will be understood that the invention is not limited to those embodiments. On the contrary, the invention covers all alternatives, modifications, and equivalents as may be included within the spirit and scope of the appended claims.

What is claimed is:

1. A housing member for a friction clutch comprising:
a circular housing member for mating with a cover member as a portion of a friction clutch for operating a radiator cooling fan;
said housing member having a central opening and outer perimetral edge;
a first annular fan mounting surface positioned on said housing member adjacent said central opening;
a second annular fan mounting surface positioned on said housing member between said first annular fan mounting surface and said outer perimetral edge;
a raised annular ridge member positioned between said first and second annular mounting surfaces;
a first set of fan member mounting holes on said first annular fan mounting surface;
a second set of fan member mounting holes on said second annular fan mounting surface;
wherein said raised annular ridge member can act as a pilot member for mounting cooling fans on said second mounting surface.

2. The housing member as described in claim 1 wherein one of said first and second sets of fan member mounting holes has threads therein for mating with fasteners.

3. The housing member as described in claim 2 wherein said threads comprise internally threaded plug members.

4. The housing member as described in claim 1 wherein one of said first and second annular fan mounting surfaces is machine finished in order to have a fan member mounted thereon.

\* \* \* \* \*